Aug. 8, 1944.    E. H. LINKNER    2,355,311
SORTING MACHINE
Filed Jan. 26, 1942    6 Sheets-Sheet 1

INVENTOR
EDWARD H. LINKNER
BY
ATTORNEY

Aug. 8, 1944.  E. H. LINKNER  2,355,311
SORTING MACHINE
Filed Jan. 26, 1942   6 Sheets-Sheet 2

INVENTOR
EDWARD H. LINKNER
BY
ATTORNEY

Aug. 8, 1944.  E. H. LINKNER  2,355,311
SORTING MACHINE
Filed Jan. 26, 1942  6 Sheets-Sheet 3

INVENTOR
EDWARD H. LINKNER
BY 
ATTORNEY

Aug. 8, 1944.  E. H. LINKNER  2,355,311
SORTING MACHINE
Filed Jan. 26, 1942  6 Sheets-Sheet 4

INVENTOR
EDWARD H. LINKNER
BY
ATTORNEY

Aug. 8, 1944.   E. H. LINKNER   2,355,311
SORTING MACHINE
Filed Jan. 26, 1942    6 Sheets-Sheet 5
Fig. 9
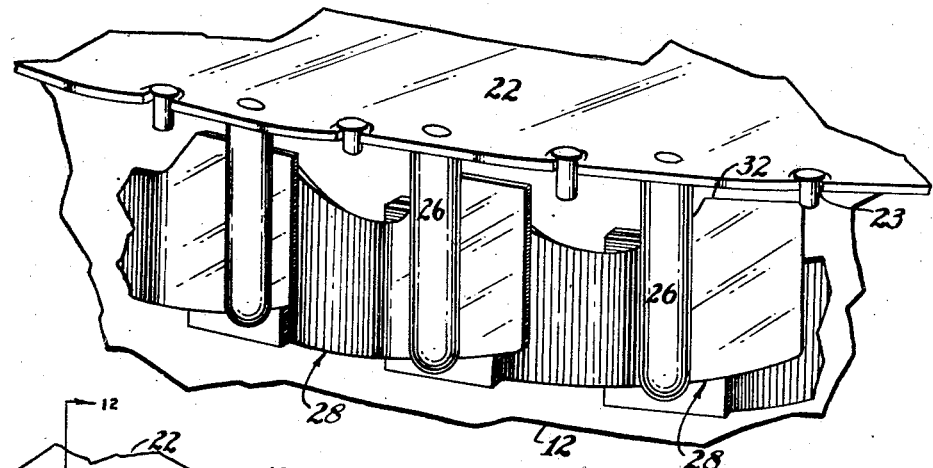
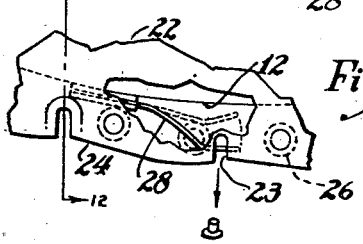
Fig. 10
Fig. 11
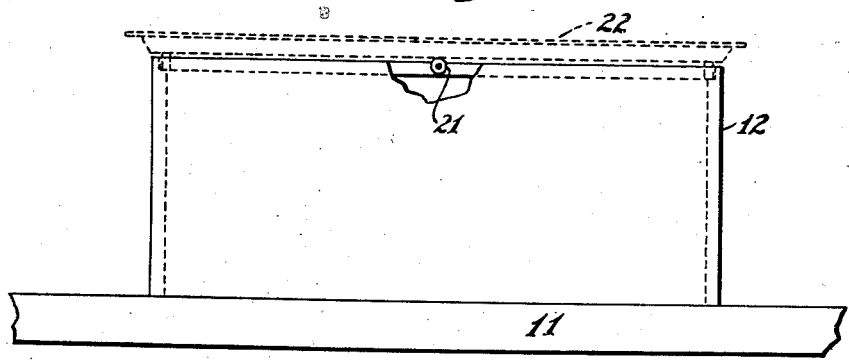
Fig. 12
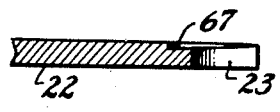
INVENTOR
EDWARD H. LINKNER
BY
ATTORNEY Aug. 8, 1944. E. H. LINKNER 2,355,311
SORTING MACHINE
Filed Jan. 26, 1942 6 Sheets-Sheet 6

INVENTOR
EDWARD H. LINKNER
BY
ATTORNEY

Patented Aug. 8, 1944

2,355,311

UNITED STATES PATENT OFFICE 2,355,311

SORTING MACHINE

Edward H. Linkner, Kenmore, N. Y., assignor to Curtiss-Wright Corporation, a corporation of Delaware Application January 26, 1942, Serial No. 428,180

7 Claims. (Cl. 209—90)

This invention relates to sorting machines and more particularly to machines for sorting fastening devices such as headed rivets, screws and the like.

Modern aircraft manufacturers make use of hundreds of thousands of rivets in the fabrication of fuselages and airfoils, the rivets being of relatively small diameter and short length. Rivet diameters may be from $\frac{3}{32}$ inch up to $\frac{1}{8}$ inch and lengths may vary from $\frac{1}{8}$ to $\frac{3}{4}$ inch. Rivet heads may be of various types such as button, flat, countersunk, etc. During the fabrication of parts, hundreds of rivets are dropped daily and are eventually picked up in the floor sweepings from which they are recovered and sorted for diameter, head form and length.

Means for separating foreign materials, means for separating rivets for diameters and means for separating the various head shapes are known in the art. It is known also that means for separating rivets of different lengths is in use, but that said last named means has not been entirely satisfactory nor fully automatic in operation, it being necessary to depend upon partial manual manipulation to assure uninterrupted operation.

The primary object of this device is to provide an apparatus which will sort mixed lengths of headed materials such as screws and rivets, particularly the latter.

Another object is to provide a sorting apparatus which is substantially automatic in operation.

A further object is to provide an apparatus which will sort a mixture of parts and discharge similar parts into proper receptacles.

Further objects of the invention and novel features of the construction will be apparent from the following specification, when considered together with the accompanying drawings, in which:

Fig. 9 is an enlarged perspective fragmentary view of the distributor disc with its serrations and pins; also shown are the ejectors as mounted on the supporting shell;

Fig. 10 is a fragmentary plan of a portion of the distributor and ejector mechanism;

Fig. 11 is an elevation partly broken away showing one of several rollers which support the distributor disc;

Fig. 12 is a fragmentary section taken on the line 12—12 of Fig. 10;

Figure 2:
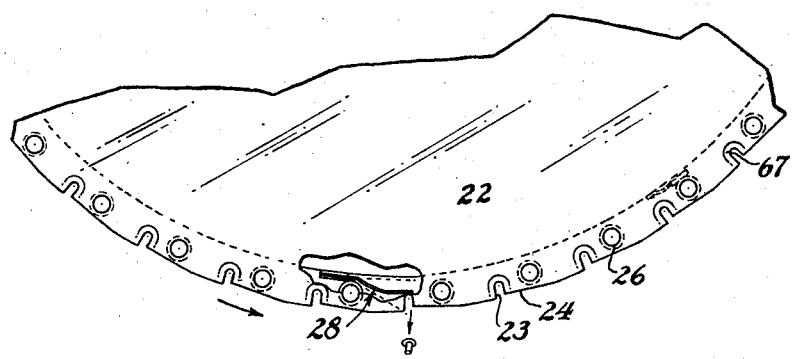
Fig. 2 is a fragmentary plan view on an enlarged scale of a distributor disc.

As noted in the objects above, the present machine serves to sort mixed length elements into a plurality of bins each arranged to receive elements of specific length. The machine comprises a supporting assembly consisting of legs 10 secured to a top 11 on which is mounted a cylindrical drum 12 provided with dowel holes 13 to which are fitted dowels 14 carried by bins 15 arranged peripherally around the drum 12. Within the drum and extending thereabove, is a shaft 16 rotated by a motor 18 through a belt 19 and bevel gear 20. The shaft 16 carries a rotating table or disc 22 supported in part by rollers 21 (Fig. 11) whose edge is formed with a plurality of U-shaped notches 23 of such width as to receive the shanks of rivets or screws while the heads of the rivets or screws engage the table top. Ramps 24 are formed on the counterclockwise side of each notch 23, as shown in Fig. 2. Between notches, depending pins 26 are secured for a purpose to be described shortly.

Figure 3:
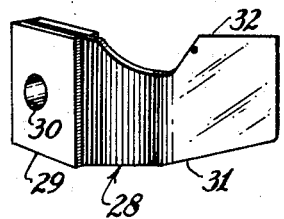
Fig. 3 is an enlarged perspective view showing one of several ejectors (one only of which is shown in Fig. 1)
Figure 4:
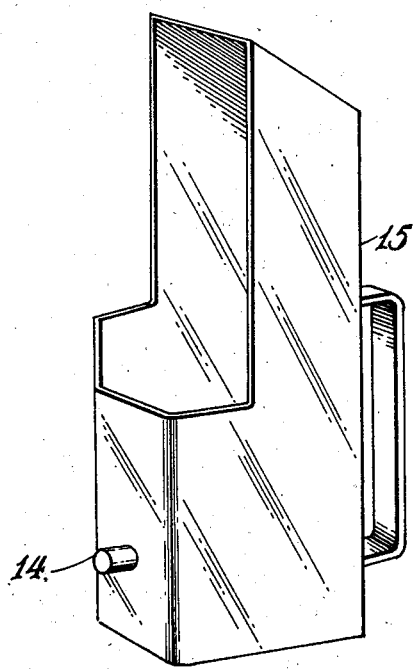
Fig. 4 is a perspective view of one of several receptacles (but one of which is shown in Fig. 1)

Upon the sides of the drum 12 are arranged a plurality of ejector assemblies 28, only one of which is shown in the drawings. Such an ejector assembly is shown in Fig. 3 to comprise a mounting pad 29 having a hole 30 through which a capscrew passes to secure the drum. From the pad 29 a spring arm 31 extends, each arm having a top edge 32 at a specified distance below the top face of the table 22. Assuming that rivets or the like are engaged in the notches of the table, as the table rotates, the pins 26 will successively engage the ends of the spring arms 31, pressing the springs toward the drum 12 until the pins pass from the ends of the spring arms, whereupon the latter snap radially outwardly. If a rivet or screw happens to be of such length that it may be engaged by the spring arm as it snaps outwardly, the spring will flick the rivet or screw from the table into the bin 15 adjacent thereto. Regardless of possible low speed of the table 15, the spring will thus have sufficient energy to discharge a rivet dynamically from the table into the bin, promoting the positive discharge of rivets from the table. Preferably, the spring arm assemblies 26 are so disposed that the lowest one is at the first station on the counter-clockwise side of a feed chute 35 which serves to place rivets or screws properly in the notches on the table 22. Thus, the longest rivets or screws are flicked from the table first, and as the table rotates, progressively shorter screws are flicked from the table into their appropriate bins.

Figure 1:
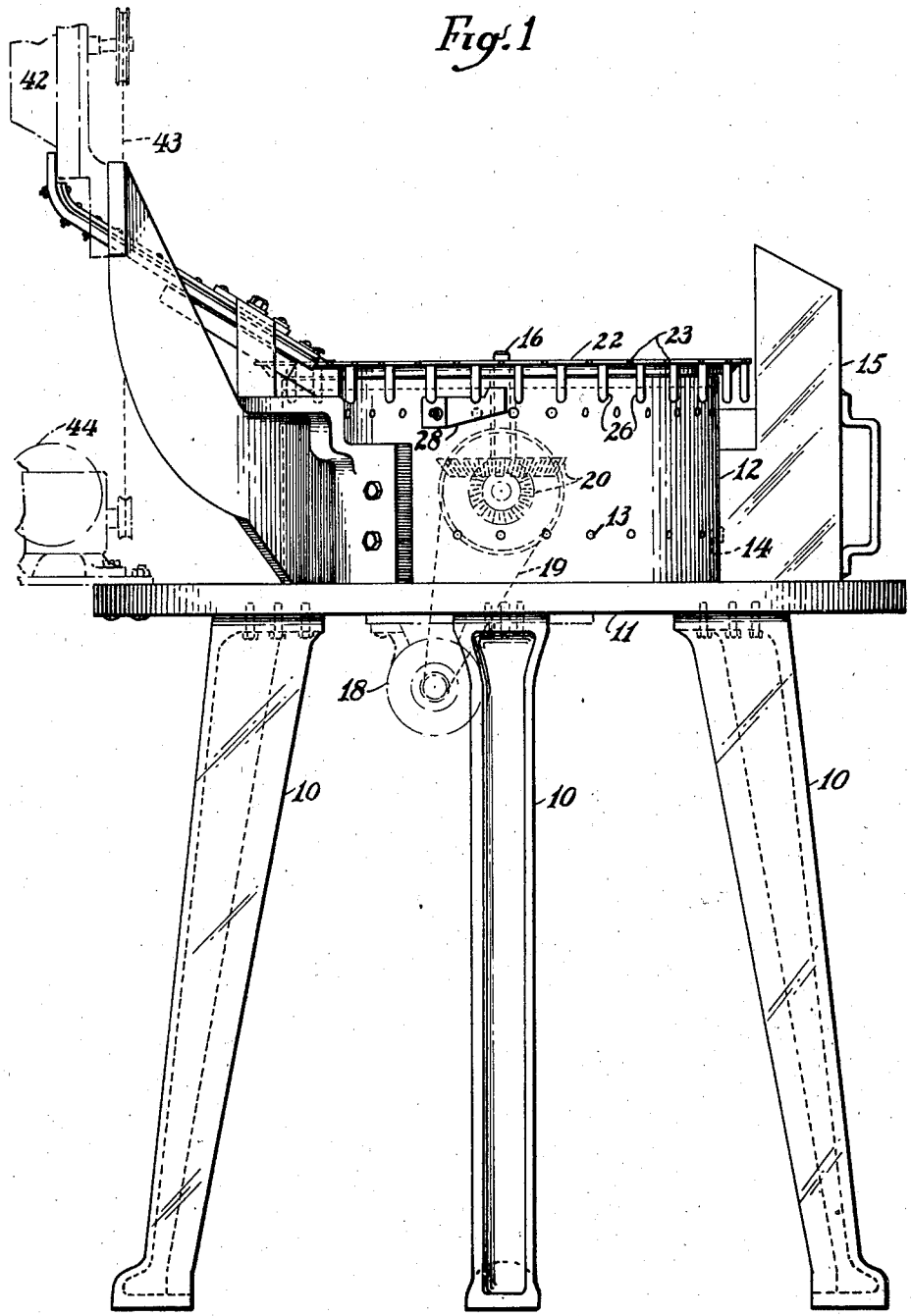
Fig. 1 is a view in side elevation of a sorting machine constructed in accordance with the preferred embodiment of my invention.
Figure 6:
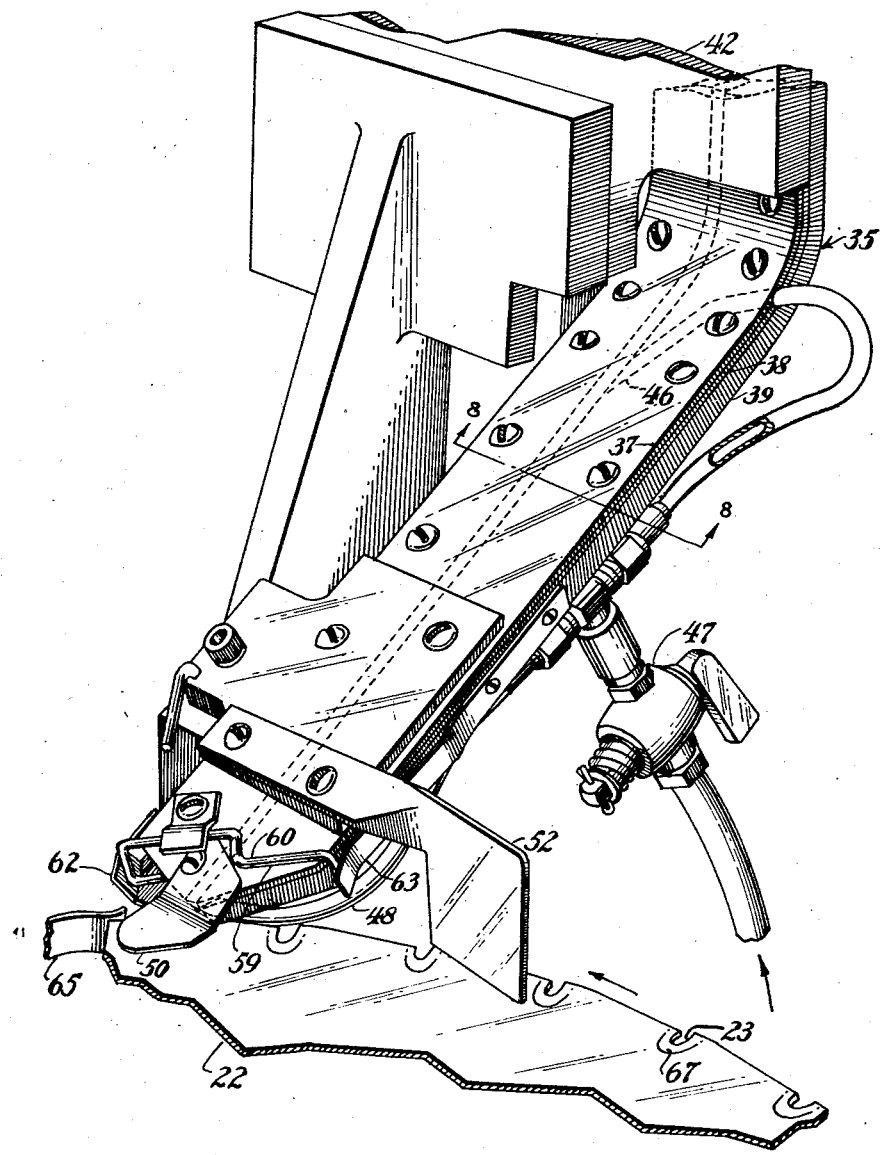
Fig. 6 is a perspective view of a portion of the feed chute.
Figure 6:
Figure 7:
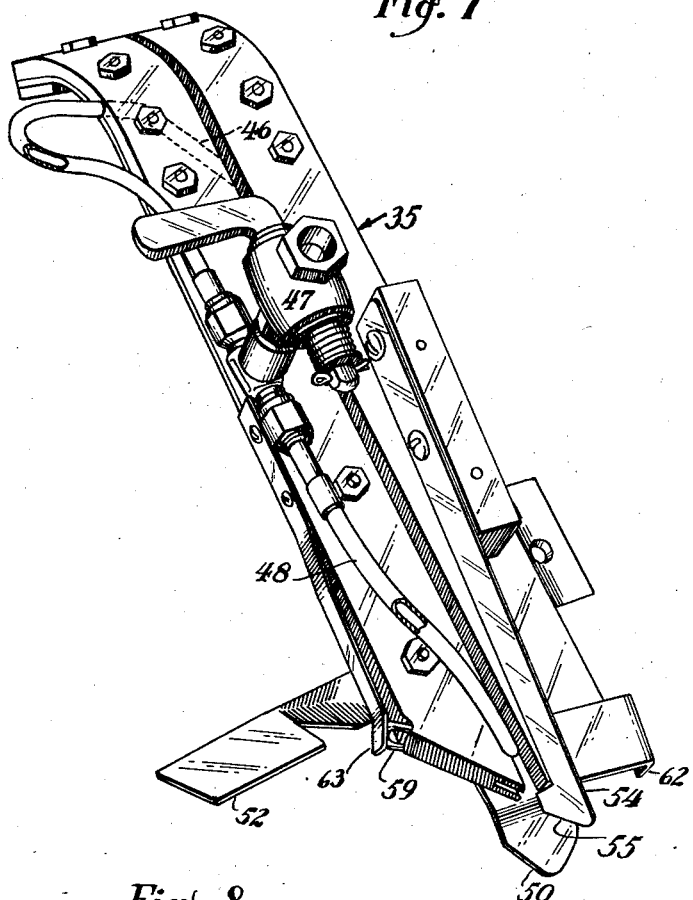
Fig. 7 is a perspective view of said chute as seen from the bottom.
Figure 8:
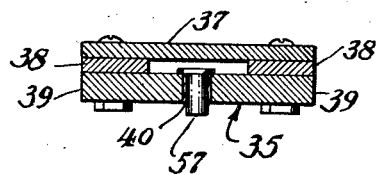
Fig. 8 is a cross-sectional view taken on the line 8—8 of Fig. 6.

Reference may be made to Figs. 6, 7, 8, 13, 14 and 15 for details of the feed chute. The chute comprises a bridge plate 37, laterally spread spacers 38 secured therebeneath, and laterally spaced guides 39 beneath the spacers which define between their inner edges a slot 40 through which shanks of rivets or screws may pass, the heads being engaged by the upper surfaces of the guides 39. This feed assembly is fed from a hopper 42, shown in Fig. 1, which preferably is provided with a mixing paddle, not shown, driven through a belt and pulley assembly 43 from a motor 44 secured to the support structure. Since the particular machine shown is adapted for use with light alloy rivets, feed of the rivets down the feed chute 35 is assisted by an air jet shown at 46, fed from an air valve 47. A second feed line 48 leads from the air valve to the lower or delivery end of the feed chute 35 to assist the placement of rivets upon the table 22 and also, to assist in clearing jams should they occur. As shown in Fig. 6, the bridge plate 37 of the feed chute carries a guide plate 50 to assist in seating rivets in the table notches. Also, a discharge plate 52 is secured to the feed chute and overlies the approaching side of the table 22 to discharge from the table any rivets or the like which may not have been discharged therefrom by the ejectors 26 previously described.

Figure 13:
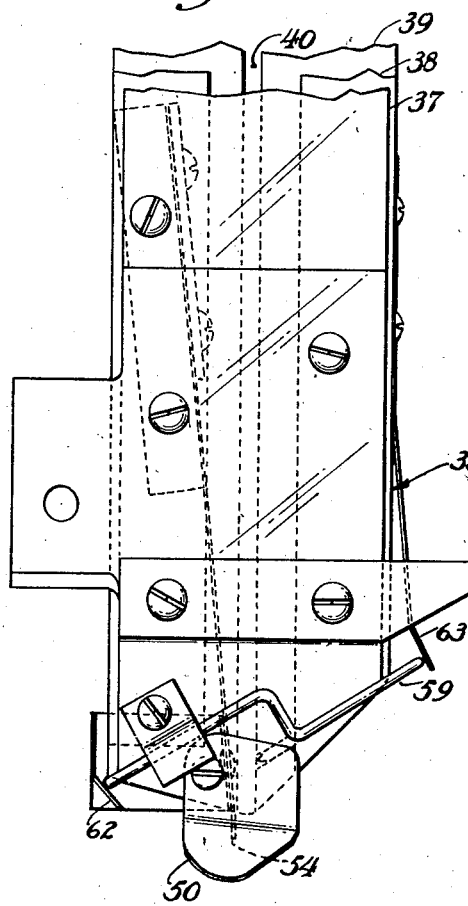
Figs. 13 and 14 are fragmentary plans of portions of the feed chute.
Figure 14:
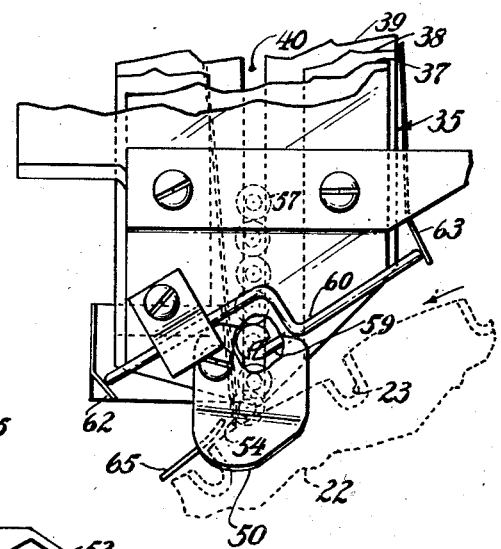
Figure 15:
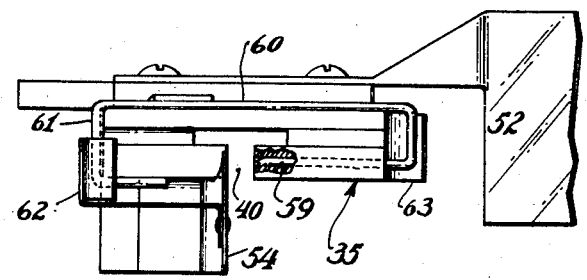
Fig. 15 is an end elevation of the lower end of the feed chute.

The feed chute carries a spring discharge lip 54 at its delivery end which, in case of a rivet jam, will retreat in the direction of rotation of the table 22 to allow jammed rivets to drop clear. This spring 54 is so shaped at its end, that a sloped portion 55 lies close to the edge of the table 22 to guide rivets from the feed chute into the notches 23 of the table. Should a rivet jam occur, as shown in Fig. 14, wherein heads of rivets 57 have become overlapped, the spring 54 will yield to the left, or in a counter-clockwise direction, to relieve the jam. Concurrently, a stop pin 59 slides across the feed chute slot 40 to prevent the column of rivets in the feed chute from passing down the chute until the jam is cleared and until the spring 54 resumes its normal position as a continuation of the slot 40, as shown in Fig. 13. The stop pin 59 is interconnected with the spring 54 as follows: The pin is crossed over the top of the feed chute 35 as at 60 and bears at its left end 61 on a plate 62 secured to the spring 54. Furthermore, the pin 59 is urged toward a chute stopping position by a weak spring 63 which may readily be overcome by the spring 54. Thus, when the spring 54 is pressed leftwardly, as shown, by jammed rivets, the spring 63 presses the stop pin 59 leftwardly. When the feed chute jam is cleared, the spring 54 moves to the right, overcoming the spring 63 and moving the stop pin 59 to the right to clear the feed chute for continued feeding of rivets therefrom to the table notches.

The above described jam clearing mechanism is simple in construction and has been found to be effective in operation. It is apparent, however, that its constructional details may be altered considerably to secure substantially the same result so that applicant does not wish to limit himself, as to the scope of the invention, by the specific mechanism shown. Functionally, the essence of the jam clearing arrangement is to provide a yielding feed lip, such as the element 54 which, when it yields in response to jamming, will stop the feed of rivets or other elements through the chute and, upon jam clearance, will reopen the feed chute for normal operation.

An additional guide strip 65 is secured to the stationary portions of the mechanism to hold rivets in position in their notches until they are beyond the influence of the air jet 46. As an added measure to prevent inadvertent displacement of rivets or the like from the table 22, the surface of the table 22, in the vicinity of the notches 23, is counterbored with a backward slope, as shown in Fig. 12 at 67, which, under the influence of vibration and gravity, seats the rivets or the like quite firmly in the table notches until the rivets are flicked therefrom by the ejectors 26.

Figure 5:
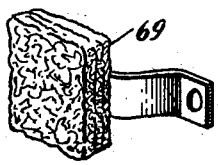
Fig. 5 is a perspective view of a lubricating pad (indicated in Fig. 2)

Figs. 2 and 5 show lubricator pads 68 secured to the drum 12 by which the pins 26 are continually lubricated to avoid excessive wear in conjunction with their engagement with the ejectors 26.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a distributing mechanism, a table having a plurality of notches along an edge thereof for reception of headed elements, and a feed mechanism comprising a hopper, a track fed by the hopper and terminating adjacent the table edge, said track serving to convey elements from the hopper to the table edge notches, a stop member movable at least partially across said track in response to jamming of elements at the delivery end of said track to stop passage of elements through said track until the jam is cleared, and pneumatic means for urging the passage of elements along said track.

2. In a distributing mechanism, a table having a plurality of notches along an edge thereof for reception of headed elements, and a feed mechanism comprising a hopper, a track fed by the hopper and terminating adjacent the table edge, said track serving to convey elements from the hopper to the table edge notches, a stop member movable at least partially across said track in response to jamming of elements at the delivery end of said track to stop passage of elements through said track until the jam is cleared, a nozzle adjacent the hopper end of the track directed toward the delivery end thereof, and means to supply air under pressure to said nozzle.

3. In apparatus for sorting headed elements having stem portions of various lengths, a support, a substantially horizontal disc rotatably mounted thereon and having a plurality of peripheral notches, means to feed said elements to said disc for engagement in said notches with the heads of said elements resting on the upper surface of said disc and with their stem portions extending vertically below said disc, a plurality of serially disposed ejectors on said support having their upper edges spaced at varying distances vertically below said disc, and means operative upon rotation of said disc to radially snap said ejectors for snap discharge of said elements.

4. In apparatus for sorting headed elements having stem portions of various lengths, a substantially horizontal table having notches along an edge, means to feed said elements to said table for engagement in said notches with the heads of said elements resting on the upper surface of said table and with their stem portions extending vertically below the table, a support with respect to which said table is movable, an ejector member operable to discharge elements of predetermined length, said ejector member being mounted on said support and having its upper edge spaced a distance below said table depending on the length of the elements to be discharged thereby, and means operative upon movement of said table to intermittently snap said ejector member along a substantially horizontal path.

5. In apparatus for sorting headed elements having stem portions of various lengths, a support, a substantially horizontal disc rotatably mounted on said support and having a plurality of peripheral notches adapted to receive said elements with their head portions resting on the upper surface of said disc and with their stem portions extending vertically below said disc, a plurality of serially disposed ejector members on said support having their upper edges vertically spaced at varying distances from said disc, said ejector members being resiliently biased radially outward, and means carried by the disc and operable upon rotation of the disc to radially retract said ejector members and then release them for snap discharge of said elements.

6. In apparatus for sorting headed elements having stem portions of various lengths, a support, a substantially horizontal table having notches along an edge and movable with respect to said support, means to feed said elements to said table for engagement in said notches with the heads of said elements resting on the upper surface of said table and with their stem portions extending vertically below the table, a plurality of serially disposed ejector members on said support having their upper edges vertically spaced at varying distances from said table, and means operative upon movement of said table to intermittently snap said ejector members along a substantially horizontal path for selective discharge of said elements.

7. In apparatus for sorting headed elements having stem portions of various lengths, a support, a substantially horizontal table having notches along an edge and movable with respect to said support, means to feed said elements to said table for engagement in said notches with the heads of said elements resting on the upper surface of said table and with their stem portions extending vertically below the table, a plurality of serially disposed ejector members on said support having their upper edges vertically spaced at varying distances from said table, a plurality of means depending from said table and intermittently engageable with said ejector members upon movement of said table to intermittently snap said ejector members along a substantially horizontal path for selective discharge of said elements.

EDWARD H. LINKNER.